Nov. 28, 1967   D. W. GRIMM ET AL   3,354,757
SPLINE WRENCHING CONFIGURATIONS
Filed June 13, 1966   2 Sheets-Sheet 1
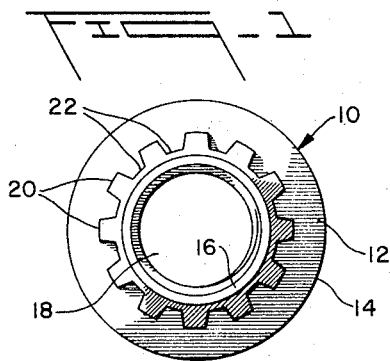
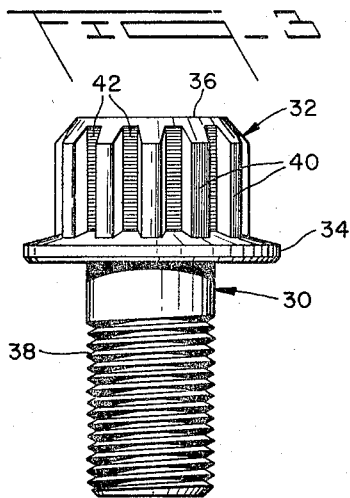
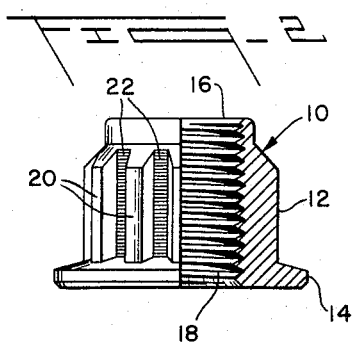
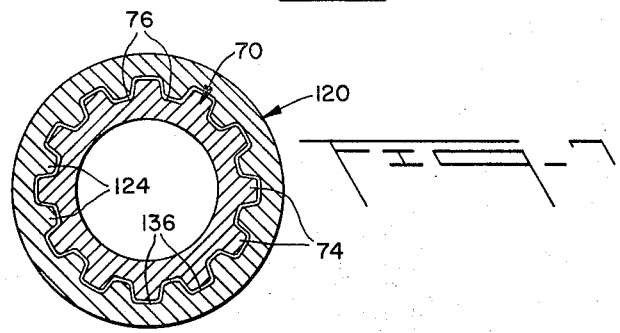
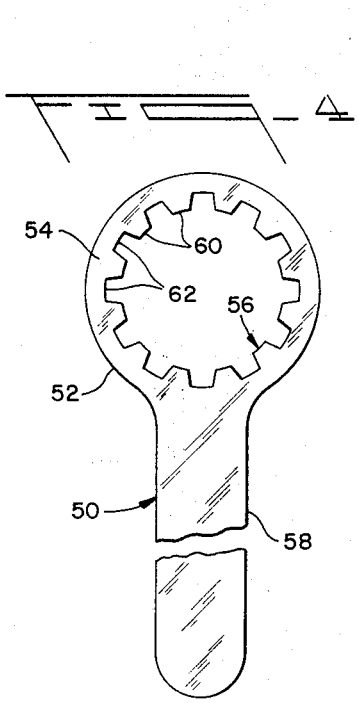
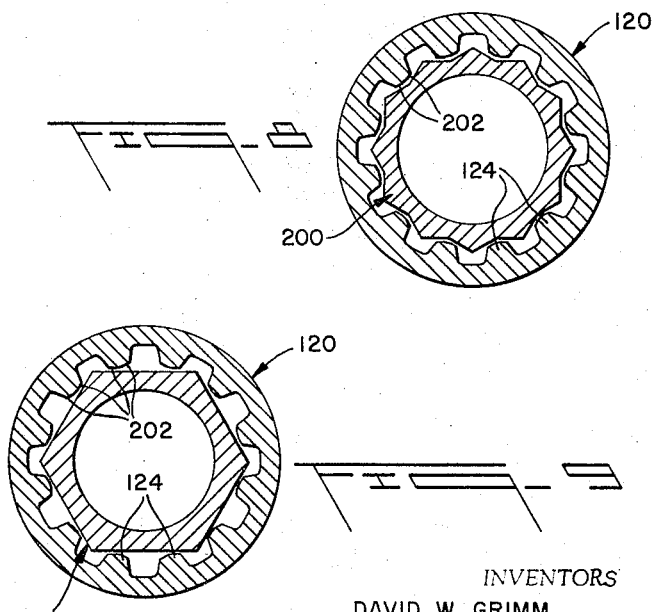
INVENTORS
DAVID W. GRIMM
RICHARD C. BAUBLES
ATTORNEYS Nov. 28, 1967  D. W. GRIMM ET AL  3,354,757
SPLINE WRENCHING CONFIGURATIONS
Filed June 13, 1966  2 Sheets-Sheet 2
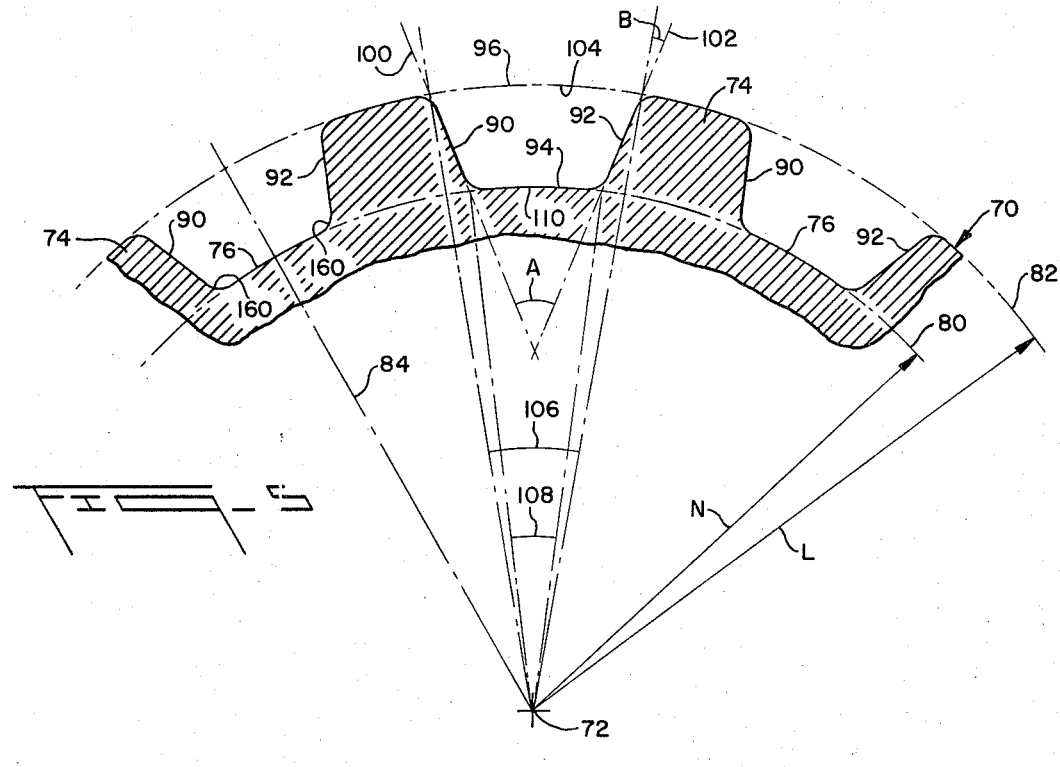
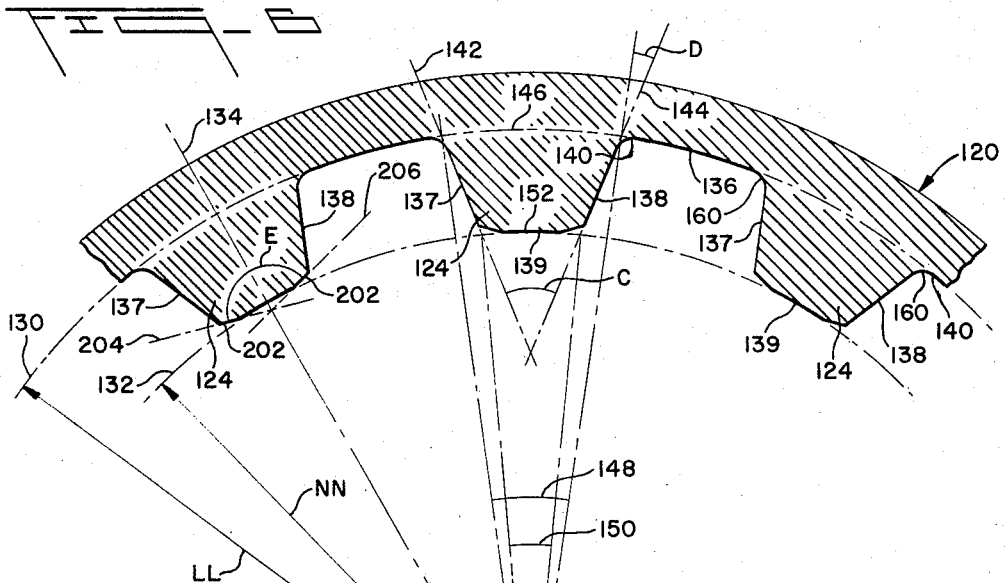
INVENTORS
DAVID W. GRIMM
RICHARD C. BAUBLES
ATTORNEYS

United States Patent Office 3,354,757
Patented Nov. 28, 1967

3,354,757
SPLINE WRENCHING CONFIGURATIONS
David W. Grimm, Watchung, and Richard C. Baubles, Maplewood, N.J., assignors to Elastic Stop Nut Corporation of America, Union, N.J., a corporation of New Jersey
Filed June 13, 1966, Ser. No. 557,072
9 Claims. (Cl. 81—90)

ABSTRACT OF THE DISCLOSURE

A wrenching configuration in a cylindrical member such as a nut, bolt or wrench which allows nuts or bolts having a relatively wide range of strength or hardness to be successfully wrenched with a single wrench of predetermined strength or hardness without failure of the wrench or the wrenched member, the cylindrical member including a plurality of similar longitudinally extending wrenching splines defined by a plurality of similar profiles disposed circumferentially around the central axis of the member and spaced equidistant from one another, the profiles establishing a configuration in each spline which tapers from a relatively broader root to a narrower apex, the tapered configuration being such that the cylindrical member is capable of easy fabrication and the nominal lateral width of the splines is so related to the spacing between the splines as to tend to distribute shear strength available in the splines of engaged complementary wrenching configurations of complementary cylindrical members, such as a nut and a wrench, in each such member along the lateral widths in both members during the application of the desired wrenching torque in wrenching operations, the distribution being accomplished by choosing a taper which, for a chosen range of strength of the wrenched member, or nut, will, upon application of maximum wrenching torque, tend toward shearing of the splines of the weakest wrenched member at the roots of the splines and shearing of the splines of the wrenching member, or wrench, at the roots thereof by the strongest wrenched member.

---

The present invention relates generally to wrenching configurations for fasteners or other members and pertains, more specifically to an improved wrenching configuration employing the principle of spline wrenching in connection with fasteners such as nuts and bolts and with wrenches for such fasteners.

Wrenching configurations employing splines for the driving engagement necessary between inner members to be wrenched, such as nuts and bolts, and wrenching outer members, such as socket wrenches, have been recognized as providing distinct advantages in the driving of a fastener during the assembly of mating fastener components. Spline configurations have been found to provide optimum mutual engagement between the inner and outer mated components and, where the splines are properly constructed, all wrenching forces are directed into a wrenching torque and no component of such forces is in a direction which would tend to burst the outer member, or wrench. Thus, the theoretical optimum configuration for splines formed in the head of a fastener and corresponding splines formed in the socket of a wrench would be a straight sided, truncated portion of the area formed by radial lines emanating from the mutual centerline of the fastener and the wrench. The circumferential width of each spline in each cooperating component would be based upon the relative strength or hardness of the components so that the shearing load placed upon the splines of each component may be balanced.

As a practical matter, however, the theoretical configuration would be exceptionally difficult to fabricate in the head of a nut or bolt or other inner member which is to be wrenched. The configuration dictated by theory requires that each spline have a "wedge" shape which diverges radially outwardly and cannot be fabricated in quantity production with current manufacturing techniques without difficulty.

An even more serious deficiency arising out of the employment of the spline configuration dictated by theory is that the theoretical configuration is unable to compensate for the variety of materials and the varied strength or hardness of the materials employed in the manufacture of both fasteners and wrenches. Since any one wrench should be able to perform satisfactorily with fasteners fabricated of relatively weak or soft materials as well as with fasteners of relatively strong or hard materials, theoretical spline configurations have not proved to be successful over a wide range of applications.

Recognizing that the inability of the theoretical spline configuration to compensate for the variation in strength or hardness of various materials lies in the inherent nature of the configuration which requires that each spline of the inner member, or fastener, will always shear at the root of the spline, since that is the smallest area over which shearing forces are applied, and that area is always smaller than the area at the root of each spline in the outer member, or wrench, the invention contemplates a configuration which can better distribute the available shear strength between the splines of the inner member and the outer member and can thus provide optimum performance over a wider range of material strength or hardness in the inner member for a given strength or hardness in the outer member.

It is therefore an object of the invention to provide a wrenching configuration for both an inner member, such as a fastener, and an outer member, such as a wrench, which configuration retains the advantages of a splined configuration in establishing a good driving engagement between the inner and outer members, but which may be employed with inner members fabricated of materials having a relatively wide range of strength or hardness.

Another object of the invention is to provide a wrenching configuration as set forth above, which configuration is readily fabricated utilizing essentially conventional manufacturing techniques.

Still another object of the invention is to provide a wrenching configuration as set forth above, which configuration does not establish excessively high components of force tending to burst the outer member upon the application of torque to the inner member, particularly where the inner member is a fastener such as a nut or bolt and the outer member is a socket wrench.

A further object of the invention is to provide a wrenching configuration as set forth above for use with fasteners and wrenches wherein the wrenches may be made compatible with existing fastener wrenching configurations, such as, for example, the currently employed hexagonal and "twelve-point" configurations, while still retaining high performance characteristics.

The invention will be more fully understood and further objects and advantages thereof will become apparent in the following detailed description of embodiments of the invention illustrated in the accompanying drawing, in which:

FIGURE 1 is a plan view of a fastener in the form of a nut employing a wrenching configuration of the invention;

FIGURE 2 is an elevational view, partially sectioned, of the nut of FIGURE 1;

FIGURE 3 is an elevational view of a bolt employing a wrenching configuration of the invention;

FIGURE 4 is a plan view of a socket wrench employing the wrenching configuration of the invention;

FIGURE 5 is an enlarged fragmentary sectional view illustrating the wrenching configuration on an inner member such as the nut of FIGURES 1 and 2 or the bolt of FIGURE 3;

FIGURE 6 is an enlarged fragmentary sectional view illustrating the wrenching configuration on an outer member such as a wrench similar to that of FIGURE 4;

FIGURE 7 is an enlarged cross-sectional view showing a wrench employing the configuration of FIGURE 6 engaged with the nut of FIGURES 1 and 2;

FIGURE 8 is an enlarged cross-sectional view showing a wrench employing the configuration of FIGURE 6 engaged with a standard twelve-point nut; and FIGURE 9 is an enlarged cross-sectional view showing a wrench employing the configuration of FIGURE 6 engaged with a standard hexagonal nut.

Referring now to the drawing, and especially to FIGURES 1 and 2, a fastener is shown in the form of a nut 10 which constitutes an inner member in a wrenching system employing the wrenching configuration of the invention. Nut 10 has a body 12 extending axially between a base 14 and a top 16. A circular threaded bore 18 extends longitudinally along the central axis of the body and the body may be permanently deformed adjacent the top thereof to render the bore elliptical in the vicinity of the top and thereby establish a self-locking mechanism in nut 10.

A series of similar wrenching splines, in this instance twelve similar wrenching splines 20, extend longitudinally along the body 12 of the nut 10 and project radially outwardly therefrom. The splines 20 are spaced about the circumference of the nut body, are equidistant from one another and are each provided with a particular shape which will be more fully described below in connection with the detailed description of the wrenching configuration established by the splines. A series of twelve similar wrenching grooves 22 are located between the splines 20, the shape of the grooves being established, largely, by the shape of the splines.

Turning now to FIGURE 3, another inner member in the form of a bolt 30 is illustrated and is seen to include a head 32 extending axially between a base 34 and a top 36. A threaded shank 38 extends downwardly from the base of the head to complete the bolt configuration. Head 32 is provided with a series of twelve similar wrenching splines 40 extending longitudinally along the head 32 of the bolt 30 and projecting radially outwardly therefrom. The splines 40 are spaced about the circumference of the bolt head, are equidistant from one another and are each provided with a particular shape which will be more fully described below in connection with the detailed description of the wrenching configuration established by the splines. A series of twelve similar wrenching grooves 42 are located between the splines 40, the shape of the grooves being established, largely, by the shape of the splines.

Referring to FIGURE 4, an outer member of the wrenching system is shown in the form of a wrench 50 having a body 52 including an enlarged cylindrical portion 54 having a socket 56 extending therethrough. The body 52 has a laterally extending handle portion 58 for turning the cylindrical portion 54 in a manner now well known in the art of wrenching. The socket 56 is provided with a series of twelve similar wrenching splines 60 extending longitudinally along the socket and projecting radially inwardly from the cylindrical portion 54 of the wrench. The splines 60 are spaced about the periphery of the socket, are equidistant from one another and are each provided with a particular shape which will be more fully described below in connection with the detailed description of the wrenching configuration established by such splines, which wrenching configuration is complementary to the wrenching configuration established upon nut 10 and the head of bolt 30. A series of twelve similar wrenching grooves 62 are located between the splines 60, the shape of the grooves being established, largely, by the shape of the splines.

Turning now to FIGURE 5, a wrenching configuration of a generally cylindrical inner member 70 of a wrenching system constructed in accordance with the invention is show in an enlarged fragmentary view. The inner member 70 extends axially along a longitudinal central axis 72 and has twelve similar wrenching splines 74, corresponding to splines 20 and 40 of nut 10 and bolt 30, respectively, disposed circumferentially around the central axis 72 and spaced equidistant from one another to establish a wrenching configuration lying in the radially extending plane of the paper perpendicular to the central axis 72. The wrenching configuration is seen to include similar profiles which are actually traces in the plane of the paper of grooves 76 lying between the splines 74. These profiles, and grooves 76, are likewise disposed circumferentially around the central axis and spaced equidistant from one another, each profile extending radially between an arc 80 of a circle of smaller diameter N having a center lying on the central axis 72 and an arc 82 of a concentric circle of larger diameter L and being symmetrical about a radial line of symmetry 84. Where the number of profiles is twelve, as shown, adjacent lines of symmetry 84 are angularly displaced from one another by an agle of 30°.

The configuration of each spline 74, and hence the configuration of the profiles, or grooves 76, is determined by the proportions necessary to produce optimum wrenching torque when the inner member is fabricated of materials within a broad range of strength, or hardness. In addition, the form of the splines must render the wrenching configuration of inner member 70 readily fabricated by largely conventional manufacturing methods. Furthermore, the wrenches themselves must be capable of simple manufacture by the employment of conventional production methods. These conditions are met by the wrenching configuration of inner member 70 wherein the splines 74 are slightly tapered from a relatively broad root to a narrower apex and the profiles, or grooves 76, are thus provided with confronting lateral boundaries 90 and 92 extending between arcs 80 and 82 from the inner radial extremity 94 of each groove 76 to the outer radial extremity 96 thereof. The confronting lateral boundaries 90 and 92 extend at least partially along lines 100 and 102, respectively, which lie in the plane of the paper and subtend an arc 104 of a larger angle 106 at the outer radial extremity 96 than the smaller angle 108 of the arc 110 subtended at the inner radial extremity 94. Thus, the confronting lateral boundaries 90 and 92 diverge radially outwardly at an angle A and the adjacent lateral boundaries 92 and 90 of consecutive profiles, or grooves, constitute the sides of each spline 74 which is provided with a tapered configuration by virtue of angle A and the resulting radial outward convergence of the adjacent lateral boundaries. Hence, splines 74 deviate from theoretical spline forms in that the sides of each spline 74 are not radially directed, but lie at a relatively small angle B with the radial direction. As best seen in FIGURE 5, the angle B is the angle formed between line 102 (or 100) and a radial line passing through the intersection of line 102 (or 100) with the arc 82 of the circle of larger diameter and may be characterized as a "contact" angle. Since the contact angle will determine the resolution of forces established when torque is applied to inner member 70 by the engagement of the splines 74 with a complementary outer member, it will be apparent that the contact angle must remain small in order to minimize those components of force which would tend to burst a complementary outer member by the establishment of excessive hoop stresses therein. Angle B must be great enough, however, to enable the inner member to be fabricated relatively easily employing generally conventional methods of manufacture.

Referring now to FIGURE 6, a wrenching configuration of a generally cylindrical outer member 120 of a wrenching system constructed in accordance with the invention is shown in an enlarged fragmentary view. The outer member 120 extends axially along a longitudinal central axis 122 and has twelve similar wrenching splines 124, corresponding to splines 60 of the wrench 50, disposed circumferentially around the central axis 122 and spaced equidistant from one another to establish a wrenching configuration lying in the radially extending plane of the paper perpendicular to the central axis 122. The splines 124 have identical profiles, which are actually traces of the splines 124 in the plane of the paper, and extend radially inwardly between an arc 130 of a circle of larger diameter LL having a center lying on the central axis 122 and an arc 132 of a concentric circle of smaller diameter NN, the splines being symmetrical about a radial line of symmetry 134. Grooves 136 lie between the splines 124. Where the number of splines 124 is twelve, as shown, adjacent lines of symmetry 134 are angularly displaced from one another by an angle of 30°.

The profile of each spline 124 is determined according to the same general parameters as the profiles, or grooves 76, of the inner member 70 as described above, the profile of each spline 124 corresponding with the configuration of each groove 76. Thus, the splines 124 are slightly tapered from a relatively broad root to a narrower apex and are provided with a profile having confronting lateral boundaries 137 and 138 corresponding to the sides of the splines and extending from the outer radial extremity 140 to the inner radial extremity 139 thereof. The confronting lateral boundaries 137 and 138 extend at least partially along lines 142 and 144, respectively, which lie in the plane of the paper and subtend an arc 146 of a larger angle 148 at the outer radial extremity 140 than the smaller angle 150 of arc 152 subtended at the inner radial extremity 139. The confronting lateral boundaries 137 and 138 diverge radially outwardly at an angle C, which corresponds to angle A of the inner member 70, and the splines 124 are thus provided with the tapered configuration. Hence, splines 124 also deviate from theoretical spline forms in that the sides of each spline 124 are not radially directed but lie at a relatively small angle D with the radial direction. As best seen in FIGURE 6, angle D is the angle formed between line 144 (or 142) and a radial line passing through the intersection of line 144 (or 142) with arc 130 of the circle of larger diameter and may also be characterized as a "contact" angle and is similar to the contact angle B of the splines 74 of the inner member 70. As explained above, it is desirable to maintain the contact angle small to minimize those components of force which would establish excessive hoop stress and tend to burst the outer member 120 when the outer member engages a complementary inner member 70 and wrenching torque is applied. However, angle D must be made great enough to enable the outer member to be fabricated relatively easily employing generally conventional methods of manufacture.

When the inner and outer members 70 and 120, respectively, are brought into wrenching engagement, as shown in FIGURE 7, the splines 74 of the inner member fit within the grooves 136 of the outer member and the splines 124 of the outer member fit within the grooves 76 of the inner member. Upon the application of a desired wrenching torque, stresses will be established across the width of each of the splines 74 and 124 tending to shear the splines from their respective members. These stresses are a function of the magnitude of the torque and the area of each spline across the width thereof, which areas are found in FIGURE 7 in the circumferential or lateral distance between the sides of the respective splines. Thus, the shear strength of each spline 74 is a function of the strength of the material from which inner member 70 is fabricated and the nominal lateral distance between the sides of each spline 74, which nominal lateral distance is equal to the nominal lateral distance between adjacent lateral boundaries 92 and 90 of consecutive profiles, the nominal lateral distances being a function of angle A.

Likewise, the shear strength available in each spline 124 of the outer member 120 is a function of the strength of the material from which the outer member is fabricated and the nominal lateral distance between the sides of each spline 124, which nominal lateral distance is equal to the nominal lateral distance between confronting lateral boundaries 137 and 138 of a profile of a spline, the nominal lateral distances being a function of angle C.

It will be apparent that the above nominal lateral distances in both the inner and outer members are interrelated by virtue of the interrelation between the profiles corresponding to the configuration of grooves 76 of the inner member and the profiles corresponding to the configuration of splines 124 of outer member 120. By taking into account the relative strength or hardness of the materials chosen for each of the inner and outer members, it is now feasible to choose the proper angles A and C and the proper diameters N, L, NN and LL to distribute the shear strength available in all splines 74 and 124 to assure that all splines 74 and 124 will tend to absorb the shear load imposed by the desired wrenching torque and any failure would require that shear tend to take place across all splines 74 and 124, the angles A and C being chosen to minimize contact angles B and D and the concomitant hoop stress or bursting stress in the outer member while rendering the inner and outer members easy to fabricate. The above condition strives to achieve a tendency toward a mutual failure in both the inner and outer members over a variety of materials having a range of strengths or hardnesses rather than the failure of the splines of one member only so that shear forces are distributed over a maximum area provided by the splines of both members and shear strength is increased for the complete wrenching system. Thus, for any range of materials in the inner member, the above parameters are chosen so that during the application of maximum predetermined wrenching torque an inner member of weakest material contemplated will just tend to shear at the roots of the splines thereof while an inner member of strongest material contemplated will just tend to shear the splines of the outer member at the roots thereof. These two conditions represent the outer design limits and the worst instances of torque performance since any failure would be by the shear of the splines in one member only. For all other conditions between these limits, a failure will tend to be mutual with respect to the inner and outer members since, by virtue of the tapered configuration of the splines 74 and 124, the areas susceptible to shear are displaced from the roots of the splines and shear must occur across all of the splines 74 and 124. Thus, the maximum wrenching torque will be accommodated before any failure occurs.

A small radius 160 is preferably provided at the root of all splines in both members (see FIGURES 5 and 6) to avoid sharp corners which may raise the stress to undesirable levels at the roots of the splines.

For fasteners and wrenches of generally standard sizes, it has been found that angles A and C should be of the order of magnitude of about 35° to about 55° with a preferred nominal angle being approximately 45°.

The following tabulation illustrates the choice of nominal dimensions for satisfactory examples of the wrenching configuration of FIGURE 5 when applied to nuts or bolts of standard sizes fabricated of alloy steel having a Rockwell C hardness in the range of 30 to 58 and where the nominal angle A is 45° and the nominal angle B is about 13° to 15°:

| Example | L (Inches) | N (Inches) |
| --- | --- | --- |
| 1 | .307 | .259 |
| 2 | .380 | .324 |
| 3 | .455 | .389 |
| 4 | .530 | .455 |
| 5 | .605 | .521 |
| 6 | .677 | .585 |
| 7 | .752 | .651 |
| 8 | .900 | .781 |

The following tabulation illustrates the choice of nominal dimensions for satisfactory examples of the wrenching configuration of FIGURE 6 when applied to wrenches for wrenching the nuts and bolts set forth in the above tabulation, the wrenches being fabricated of alloy steel having a Rockwell C hardness of 50, the nominal angle C being 45° and the nominal angle D being about 14° to 15°:

| Example | L (Inches) | N (Inches) |
| --- | --- | --- |
| 1 | .315 | .262 |
| 2 | .388 | .327 |
| 3 | .463 | .392 |
| 4 | .538 | .458 |
| 5 | .613 | .524 |
| 6 | .685 | .588 |
| 7 | .760 | .654 |
| 8 | .908 | .784 |

The twelve-spline wrenching configuration of the outer member 120 renders the configuration particularly well suited for use with a twelve-point inner member, such as the twelve-point nut 200 shown in FIGURE 8, or for use with a standard hexagonal inner member such as the hexagonal nut 201 show in FIGURE 9. For this purpose, each spline 124 may be provided with auxiliary lateral boundaries 202 (see FIGURE 6) symmetrical about the line of symmetry 134 and lying along lines 204 and 206 which diverge radially outwardly at an angle E. By choosing the proper angle E, the auxiliary lateral boundaries will provide auxiliary surfaces for engaging the twelve-point nut 200 along limited areas, but at locations which are most desirable; namely, within the valleys of the twelve points. The auxiliary surfaces provided by auxiliary lateral boundaries 202 on adjacent pairs of splines 124 will also engage the standard hexagonal nut 201 for effective wrenching. Angle E is substantially greater than angle C and is chosen to match the inclination of the wrench faces of the hexagonal nut and the twelve-point nut. A preferred nominal magnitude for angle E is about 150°.

The following tabulation illustrates the compatibility of the wrenching configurations tabulated above with conventional hexagonal or twelve-point nut or bolt configurations having a nominal width W between opposite flat wrenching faces:

| Example: | W (inches) |
| --- | --- |
| 1 | .250 |
| 2 | .312 |
| 3 | .375 |
| 4 | .438 |
| 5 | .500 |
| 6 | .562 |
| 7 | .625 |
| 8 | .750 |

While the above preferred embodiments of both the inner and the outer members include twelve splines, the number of splines on either of the members can be reduced without upsetting the compatibility of the inner and outer members with one another or the compatibility of a wrench with a nut or bolt haivng a hexagonal or twelve-point configuration by assuring that the splines are oriented such that adjacent lines of symmetry 84 or 134 of each member are angularly displaced from one another at an angle equal to 360° divided by any whole number factor of twelve which is greater than one, i.e., two, three, four, six and twelve. Thus, adjacent lines of symmetry 84 may be displaced from one another at angles of 30°, 60°, 90°, 120° or 180° and adjacent lines of symmetry 134 may be displaced from one another in a like manner. The twelve-spline configuration is preferred, however, since the configuration permits lower unit bearing stress on the sides of the splines in comparison with configurations having a lesser number of splines.

Thus, wrenches employing a wrenching configuration of the invention are rendered compatible with both the standard hexagonal configuration and the now popular twelve-point configuration. Of course, where such compatibility is not required, auxiliary surfaces are not necessary and the splines within the socket of a wrench would merely have the basic configuration as shown in FIGURE 4.

It is to be understood that the above detailed description of embodiments of the invention are provided by way of example only. Various details of design and construction may be modified without departing from the true spirit and scope of the invention as set forth in the appended claims.

What is claimed is:

1. A first generally cylindrical member extending axially along a longitudinal central axis and including a plurality of similar longitudinally extending wrenching splines, each projecting radially from a root to an apex, said splines being disposed circumferentially around the central axis and spaced equidistant from one another to establish a first wrenching configuration lying in a radially extending plane perpendicular to the central axis and engagable with a complementary second wrenching configuration of a complementary second generally cylindrical member having complementary splines, each projecting radially from a root to an apex, for wrenching operations, one of said first and second generally cylindrical members being a wrenching member fabricated of a material having a predetermined strength while the other of said generally cylindrical members is a wrenched member fabricated of one of a plurality of materials having a relatively wide range of strength, said wrenching configuration permitting such wrenching operations without failure of either the first or second generally cylindrical members and comprising a plurality of similar profiles disposed circumferentially around the central axis and spaced equidistant from one another, each said profile being symmetrical about a line of symmetry lying in said radially extending plane and passing through said central axis and the lines of symmetry of adjacent profiles being angularly displaced from one another at an angle equal to 360° divided by any whole number factor of twelve which is greater than one, each said profile extending radially between an arc of a circle of smaller diameter having a center lying on the central axis and an arc of a concentric circle of larger diameter and having confronting lateral boundaries extending between said arcs from the inner radial extremity to the outer radial extremity of the profile, said confronting lateral boundaries extending at least partially along lines lying in said radially extending plane and subtending an arc of a larger angle at the outer radial extremity than the angle of the arc subtended at the inner radial extremity such that the confronting lateral boundaries of each profile diverge radially outwardly at such an angle that adjacent lateral boundaries of consecutive profiles converge radially outwardly and the angle between each lateral boundary and a radial line passing through the intersection of the line along which that lateral boundary extends with the arc of the circle of larger diameter is great enough to render the first cylindrical member capable of easy fabrication but small enough to minimize hoop stress during wrenching operations, and the nominal lateral distance between said confronting boundaries being so related to the nominal lateral distance between the adjacent lateral boundaries of consecutive profiles such that upon the application of maximum wrenching torque, a wrench member of weakest material will tend to shear at the roots of the splines thereof while a wrenched member of strongest material will tend to shear the splines of the wrenching member at the roots thereof so as to tend to distribute shear strength available in each said member along said nominal lateral distances in both members during application of the desired wrenching torque in said wrenching operations.

2. The invention set forth in claim 3 wherein the lateral boundaries of each profile diverge radially outwardly at an angle greater than 35° but less than 55° with each other.

3. The invention set forth in claim 1 wherein the number of wrenching splines is twelve, the number of profiles is twelve, and the lines of symmetry are displaced at an angle of 30° from one another.

4. The invention set forth in claim 2 wherein the lateral boundaries of each profile diverge radially outwardly at a nominal angle of approximately 45° with each other and the angle between each lateral boundary and a radial line passing through said intersection of the line along which that lateral boundary extends with the arc of the circle of larger diameter is nominally 13° to 15°.

5. The invention set forth in claim 2 wherein the first generally cylindrical member is a nut and said splines extend radially outwardly with the profiles defining the trace of longitudinal grooves between the splines in said radially extending plane, the splines being tapered from a relatively broad root at the circle of smaller diameter to a narrower apex at the circle of larger diameter.

6. The invention set forth in claim 2 wherein the first generally cylindrical member is a bolt and said splines extend radially outwardly with the profiles defining the trace of longitudinal grooves between the splines in said radially extending plane, the splines being tapered from a relatively broad root at the circle of smaller diameter to a narrower apex at the circle of larger diameter.

7. The invention set forth in claim 2 wherein the first generally cylindrical member is a socket wrench and said splines extend radially inwardly with the profiles defining the trace of the splines in the radially extending plane.

8. The invention set forth in claim 7 wherein each said profile is also provided at the radially inner portion thereof with auxiliary lateral boundaries symmetrical about said line of symmetry and lying along lines in said radially extending plane and diverging radially outwardly at an auxiliary angle to one another substantially greater than 55°.

9. The invention set forth in claim 8 wherein said auxiliary angle is approximately 150°.

References Cited

UNITED STATES PATENTS

| 1,861,640 | 6/1932 | McCabe. | |
| 2,079,056 | 5/1937 | Warren | 85—9 X |
| 2,375,249 | 5/1945 | Richer | 85—45 |

FOREIGN PATENTS

| 678,464 | 1/1964 | Canada. |
| 18,038 | 1901 | Great Britain. |
| 211,159 | 11/1940 | Switzerland. |

OTHELL M. SIMPSON, *Primary Examiner.*

M. S. MEHR, *Examiner.*

UNITED STATES PATENT OFFICE
CERTIFICATE OF CORRECTION

Patent No. 3,354,757 November 28, 1967

David W. Grimm et al.

It is hereby certified that error appears in the above numbered patent requiring correction and that the said Letters Patent should read as corrected below.

Column 4, line 17, for "show" read -- shown --; line 36, for "agle" read -- angle --; column 7, line 18, for "and" read -- or --; line 74, for "haivng" read -- having --; column 9, line 5, for "wrench" read -- wrenched --.

Signed and sealed this 28th day of January 1969.

(SEAL)
Attest:

Edward M. Fletcher, Jr.
Attesting Officer

EDWARD J. BRENNER
Commissioner of Patents